US009451130B2

(12) United States Patent
Sakai et al.

(10) Patent No.: US 9,451,130 B2
(45) Date of Patent: Sep. 20, 2016

(54) IMAGE PROCESSING APPARATUS, IMAGE ADJUSTMENT SYSTEM, IMAGE PROCESSING METHOD, AND RECORDING MEDIUM

(71) Applicant: FUJI XEROX CO., LTD., Tokyo (JP)

(72) Inventors: Noriko Sakai, Yokohama (JP); Toshihiro Iwafuchi, Yokohama (JP); Daigo Hama, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 229 days.

(21) Appl. No.: 14/095,245

(22) Filed: Dec. 3, 2013

(65) Prior Publication Data
US 2014/0375672 A1  Dec. 25, 2014

(30) Foreign Application Priority Data
Jun. 25, 2013  (JP) .................................. 2013-133018

(51) Int. Cl.
| H04N 1/60 | (2006.01) |
| G09G 5/06 | (2006.01) |
| G09G 5/02 | (2006.01) |

(52) U.S. Cl.
CPC .............. *H04N 1/603* (2013.01); *G09G 5/02* (2013.01); *G09G 5/06* (2013.01); *H04N 1/6041* (2013.01); *G09G 2340/06* (2013.01); *G09G 2360/145* (2013.01)

(58) Field of Classification Search
None
See application file for complete search history.

(56) References Cited

U.S. PATENT DOCUMENTS

| 2002/0163527 A1* | 11/2002 | Park ...................... G09G 5/003 345/594 |
| 2003/0053001 A1 | 3/2003 | Murashita et al. |

(Continued)

FOREIGN PATENT DOCUMENTS

| JP | H11-338443 A | 12/1999 |
| JP | 2005-208982 | * 8/2005 |

(Continued)

OTHER PUBLICATIONS

Vuckovic, Color calibration and dual monitor setup in Windows 7, 2011, URL: https://www.dvuckovic.com/blog/color-calibration-and-dual-monitor-setup-windows-7.*

(Continued)

*Primary Examiner* — Mark Zimmerman
*Assistant Examiner* — Phuc Doan
(74) *Attorney, Agent, or Firm* — Oliff PLC

(57) ABSTRACT

An image processing apparatus includes a type acquiring unit that acquires type information indicating a type of a display apparatus, an image selecting unit that selects a first colorimetric image for performing color conversion on the display apparatus, on the basis of the type information acquired by the type acquiring unit, an image information transmitting unit that transmits information on the first colorimetric image selected by the image selecting unit to the display apparatus, a color information acquiring unit that acquires color information of an image which is displayed on the display apparatus on the basis of the information on the first colorimetric image transmitted by the image information transmitting unit, and a conversion relationship creating unit that creates a conversion relationship for the color of an image to be displayed on the display apparatus, on the basis of the color information acquired by the color information acquiring unit.

9 Claims, 9 Drawing Sheets

(56) References Cited

U.S. PATENT DOCUMENTS

| | | | |
|---|---|---|---|
| 2006/0022993 A1* | 2/2006 | Hammond | H04N 1/6027 345/590 |
| 2006/0170939 A1* | 8/2006 | Misumi | H04N 1/6058 358/1.9 |
| 2006/0221067 A1* | 10/2006 | Kim | G06F 21/84 345/204 |
| 2009/0096815 A1 | 4/2009 | Fukuda et al. | |
| 2011/0148907 A1* | 6/2011 | Lee | G09G 3/2003 345/590 |
| 2011/0227941 A1* | 9/2011 | Huang | H04N 1/6027 345/596 |
| 2012/0013635 A1* | 1/2012 | Beeman | G09G 3/2003 345/590 |
| 2012/0229495 A1* | 9/2012 | Longhurst | H04N 1/6058 345/590 |
| 2012/0306905 A1* | 12/2012 | Kim | G09G 5/02 345/589 |

FOREIGN PATENT DOCUMENTS

| | | |
|---|---|---|
| JP | A-2005-208982 | 8/2005 |
| JP | 2009-094895 A | 4/2009 |
| JP | 2009-117951 * | 5/2009 |

OTHER PUBLICATIONS

Jul. 5, 2016 Office Action issued in Japanese Application No. 2013-133018.

* cited by examiner

| TYPE | IN-PLANE NON-UNIFORMITY | COLOR VIEWING ANGLE |
|---|---|---|
| DESKTOP | × | ○ |
| LARGE-SCREEN | ○ | ○ |
| PROJECTOR | ○ | × |
| TABLET | × | × |

○ : LIKELY TO OCCUR
× : UNLIKELY TO OCCUR

FIG. 8A
|   | COMPRESSION | EXPANSION | COMPRESSION-EXPANSION COEFFICIENT | HUE CORRECTION COEFFICIENT |
|---|---|---|---|---|
| A | ○ | ○ | HIGH | HIGH |
| B | ○ | × | MEDIUM | MEDIUM |
| C | × | × | — | — |
FIG. 8B
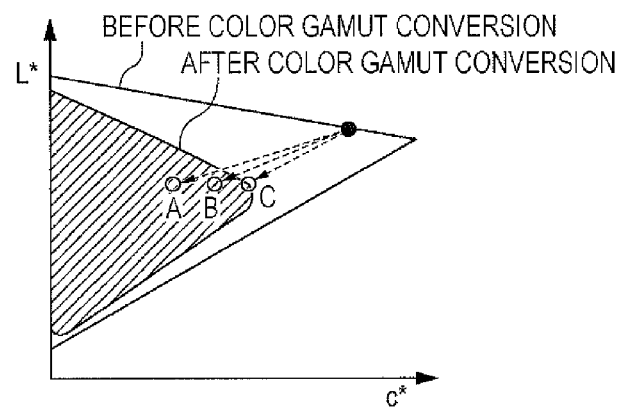
FIG. 8C
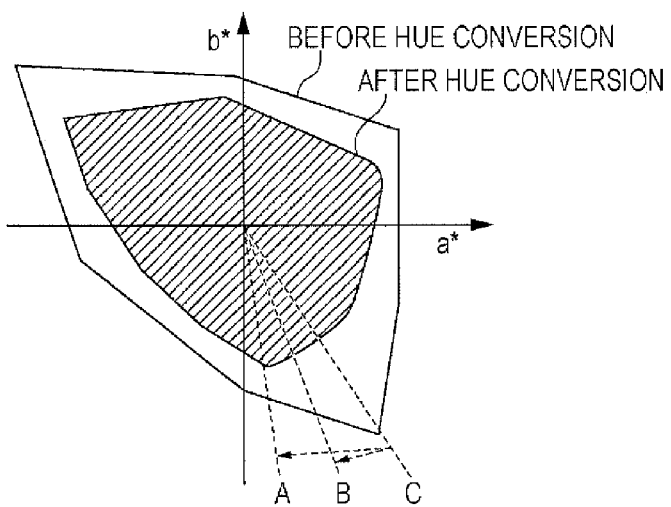

FIG. 9

| TYPE | COLOR GAMUT CONVERSION | HUE CONVERSION | IN-PLANE NON-UNIFORMITY | COLOR VIEWING ANGLE | DATA SET | ILLUMINATION ENVIRONMENT |
|---|---|---|---|---|---|---|
| DESKTOP | A | C | × | ○ | B | × |
| LARGE-SCREEN | A | C | ○ | ○ | B | ○ |
| PROJECTOR | B | A | ○ | × | A | ○ |
| TABLET | C | B | × | × | C | ○ |

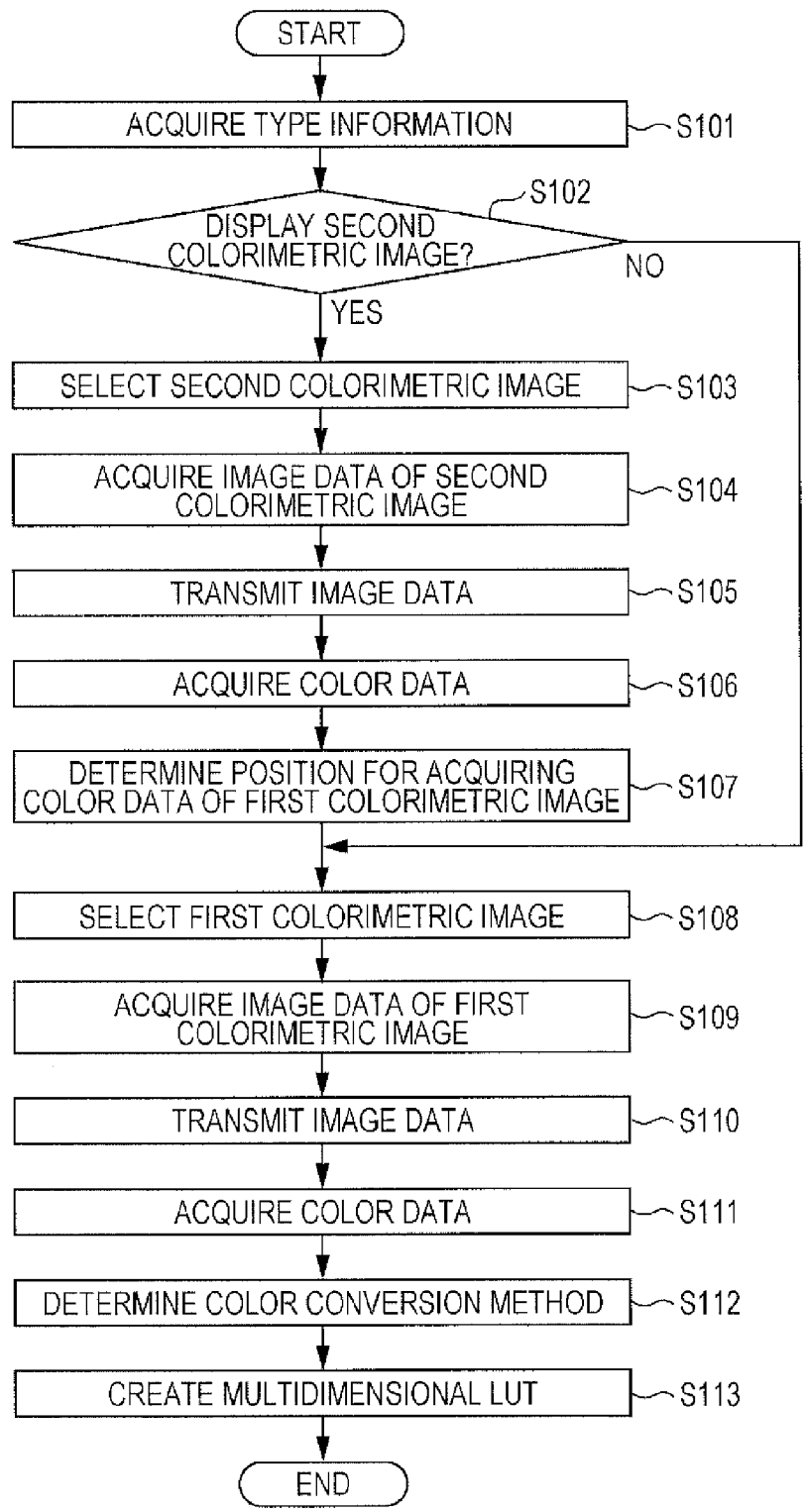

IMAGE PROCESSING APPARATUS, IMAGE ADJUSTMENT SYSTEM, IMAGE PROCESSING METHOD, AND RECORDING MEDIUM

CROSS-REFERENCE TO RELATED APPLICATIONS

This application is based on and claims priority under 35 USC 119 from Japanese Patent Application No. 2013-133018 filed Jun. 25, 2013.

BACKGROUND

Technical Field

The present invention relates to an image processing apparatus, an image adjustment system, an image processing method, and a recording medium.

SUMMARY

According to an aspect of the invention, there is provided an image processing apparatus that includes: a type acquiring unit that acquires type information indicating a type of a display apparatus; an image selecting unit that selects a first colorimetric image for performing color conversion on the display apparatus, on the basis of the type information acquired by the type acquiring unit; an image information transmitting unit that transmits information on the first colorimetric image selected by the image selecting unit to the display apparatus; a color information acquiring unit that acquires color information of an image which is displayed on the display apparatus on the basis of the information on the first colorimetric image transmitted by the image information transmitting unit; and a conversion relationship creating unit that creates a conversion relationship for the color of an image to be displayed on the display apparatus, on the basis of the color information acquired by the color information acquiring unit.

BRIEF DESCRIPTION OF THE DRAWINGS

An exemplary embodiment of the present invention will be described in detail based on the following figures, wherein:

FIGS. 8A through 8C illustrate a color conversion method performed by a color conversion method determining unit;

FIG. 9 is a table summarizing items discussed in the exemplary embodiment; and

FIG. 10 is a flowchart illustrating exemplary operations performed by the setting PC.

DETAILED DESCRIPTION

Description of Overall Configuration of Image Display System

Hereinafter, an exemplary embodiment of the present invention will be described with reference to the accompanying drawings.

Figure 1:
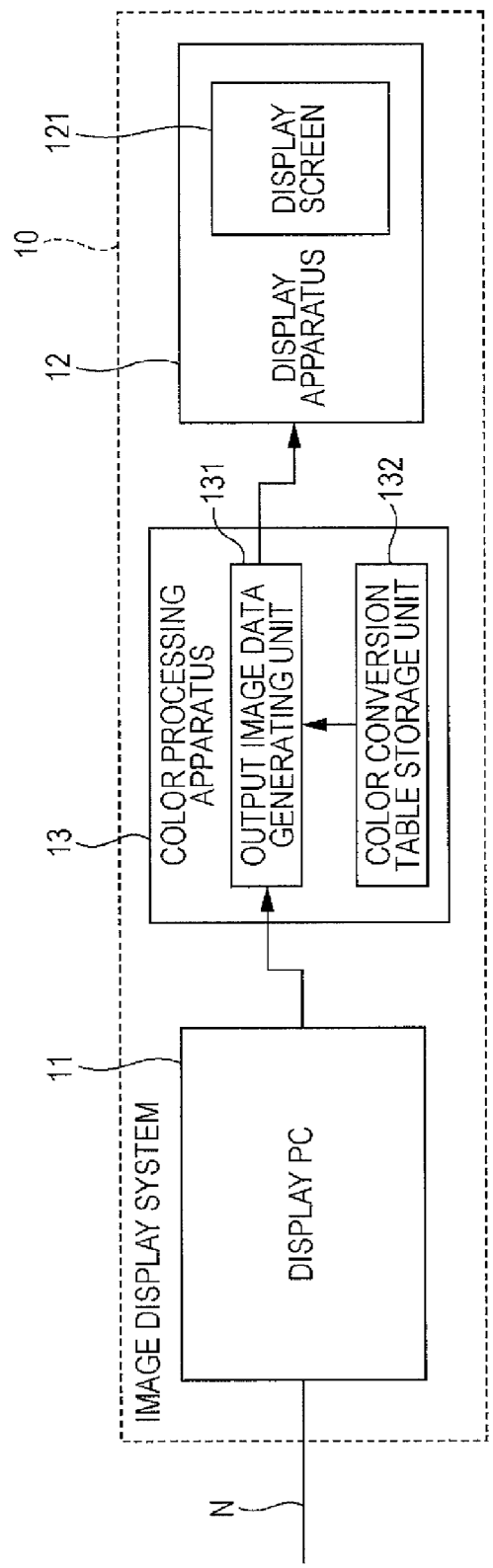
FIG. 1 illustrates an exemplary configuration of an image display system according to an exemplary embodiment.

FIG. 1 illustrates an exemplary configuration of an image display system 10 according to an exemplary embodiment. The image display system 10 includes a display personal computer (PC) 11, a display apparatus 12, and a color processing apparatus 13. The display PC 11 is connected to a network N, and generates image data for display (input image data and image information). The display apparatus 12 displays an image on the display screen 121. The color processing apparatus 13 is an example of a color converter, and performs color conversion processing on the input image data, which is input from the display PC 11, using a color conversion table (conversion relationship), and outputs the obtained image data (output image data for display) to the display apparatus 12. The image display system 10 is connected to another image display system, various types of printers, and the like, via the network N.

In the image display system 10, the display PC 11 and the color processing apparatus 13 are connected via a digital visual interface (DVI). Also, the color processing apparatus 13 and the display apparatus 12 are connected via a DVI. Note that the connection may be made via a High-Definition Multimedia Interface (HDMI) (registered trademark) or a DisplayPort, in place of a DVI.

The display PC 11 is an example of a supply apparatus, and is a so-called general-purpose personal computer. The display PC 11 generates input image data by operating various types of application software, under the control of the OS.

The display apparatus 12 has a function of displaying an image using additive color mixture, and may be a liquid crystal display for PC, a liquid crystal television, a projector, or the like. That is, the display system of the display apparatus 12 is not limited to the liquid crystal system. In the example of FIG. 1, the display screen 121 is disposed within the display apparatus 12. However, for example, in the case where a projector is used as the display apparatus 12, the display screen 121 may be a screen or the like disposed outside the display apparatus 12.

The color processing apparatus 13 includes an output image data generating unit 131 and a color conversion table storage unit 132 as an example of a storage unit.

The output image data generating unit 131 performs color conversion on input image data, which is input from the display PC 11, using the color conversion table read from the color conversion table storage unit 132, and outputs the obtained output image data for display to the display apparatus 12.

The color conversion table storage unit 132 stores the color conversion table used by the above-mentioned output image data generating unit 131 for generating an output image data for display. Examples of the color conversion table include a conversion matrix, a one-dimensional look up table (LUT), a multidimensional LUT. In this exemplary embodiment, a multidimensional LUT is used in order to perform color conversion with higher accuracy. The color conversion table storage unit 132 may be a readable and writable nonvolatile memory (for example, flash memory) capable of retaining stored data without power supply.

In the image display system 10 of FIG. 1, the single display PC 11 is connected to the single display apparatus 12 via the single color processing apparatus 13. However, the configuration is not limited thereto. For example, the image display system 10 may have a so-called multi-monitor configuration in which plural display apparatuses 12 are connected to the single color processing apparatus 13 so as to display continuous different images on the different display apparatuses 12.

In the image display system 10 of this exemplary embodiment, the color processing apparatus 13 generates output image data for display by performing color conversion processing on input image data, in place of the display PC 11. The color conversion table used for color conversion processing by the color processing apparatus 13 is created, in view of the device characteristics of the display apparatus 12 and the device characteristics of the other display system, printers, and the like connected via the network N, so as to achieve a consistent color representation between the image display system 10 of FIG. 1 and the other image display system, the printers, and the like. In the image display system 10, an external color setting system (illustrated below) is attached to the image display system 10 upon creating the color conversion table in view of the device characteristics of the display apparatus 12.

Next, a description will be given of a color setting system that is attached to the image display system 10 upon creating a color conversion table used by the color processing apparatus 13.

Figure 2:
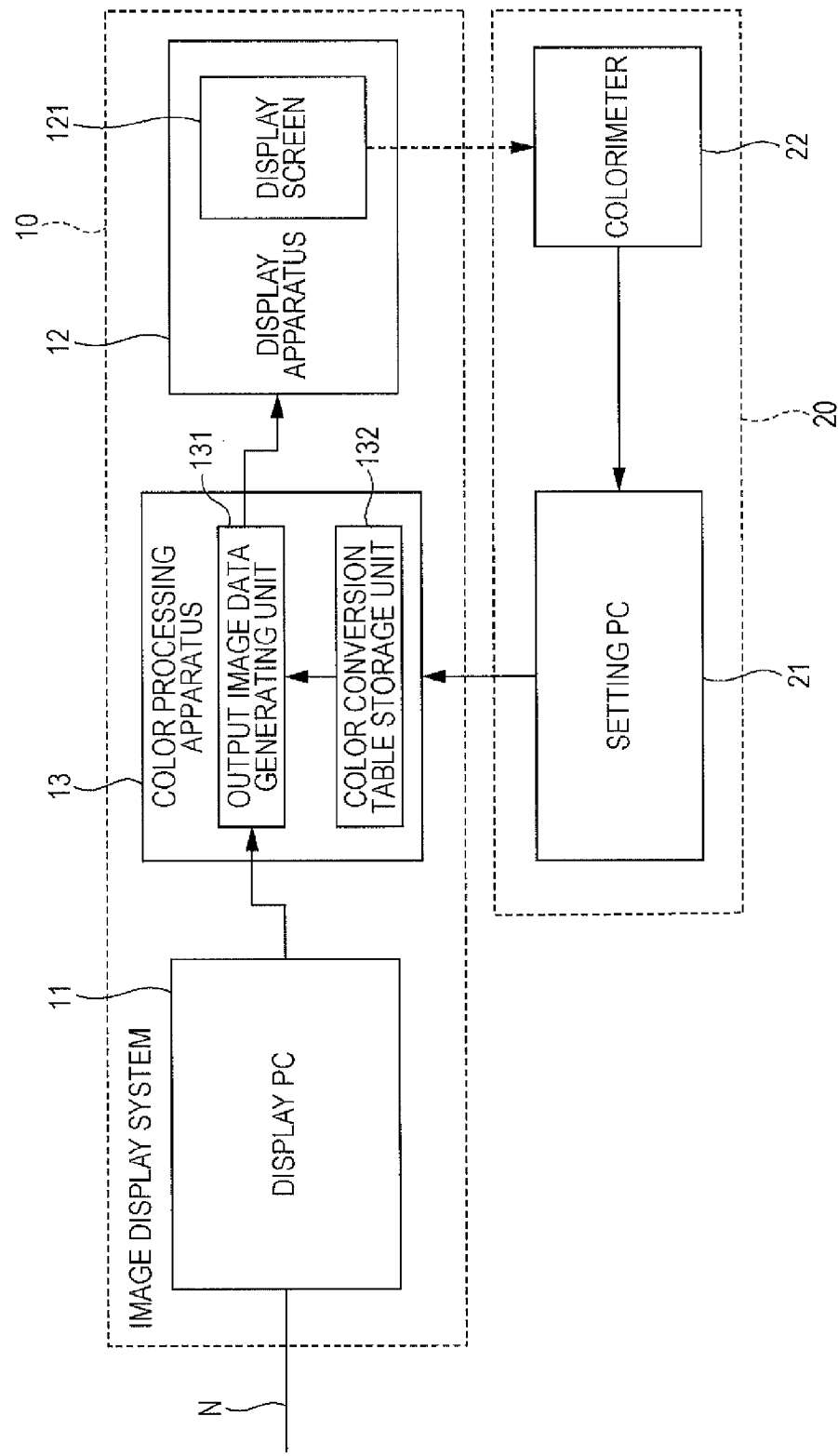
FIG. 2 illustrates an image display system of FIG. 1 with a color setting system attached thereto.

FIG. 2 illustrates the image display system 10 of FIG. 1 with a color setting system 20 attached thereto.

The color setting system 20 of this exemplary embodiment includes a setting PC 21 connected to the color processing apparatus 13 of the image display system 10, and a colorimeter 22 that is connected to the setting PC 21 and measures the color of an image displayed on the display screen 121 of the display apparatus 12 of the image display system 10.

In the color setting system 20, the setting PC 21 and the colorimeter 22 are connected via a universal serial bus (USB) or an RS-232C. Further, the setting PC 21 of the color setting system 20 and the color processing apparatus 13 of the image display system 10 are connected via a USB.

In the color setting system 20, the setting PC 21 is a so-called general-purpose personal computer, as will be described below in greater detail. For example, the setting PC 21 may be a notebook PC with a high portability, or the like. The setting PC 21 also operates various types of application software under the control of the OS.

The colorimeter 22 includes a sensor that is in or out of contact with the display screen 121 of the display apparatus 12 of the image display system 10 and that measures the color of an image displayed on the display screen 121. In this example, the size of the measurement area measured by the sensor of the colorimeter 22 is less than the size of the display screen 121. The colorimeter 22 is configured not to measure the color in the entire area of the display screen 121, but to measure the color in a predetermined part of the area of the display screen 121.

In the color setting system 20 of FIG. 2, the single setting PC 21 is connected to the single colorimeter 22. However, the configuration is not limited thereto. For example, plural colorimeters 22 may be connected to the single setting PC 21.

In this exemplary embodiment, the setting PC 21 of the color setting system 20 is capable of creating a color conversion table, and writing the color conversion table in the color conversion table storage unit 132 of the color processing apparatus 13 of the image display system 10. In this exemplary embodiment, the setting PC 21 may be regarded as a conversion relationship creator (image processing apparatus) that creates a color conversion table used by the color processing apparatus 13.

In this exemplary embodiment, the image display system 10 usually displays an image (display image) based on output image data for display, which is obtained by causing the color processing apparatus 13 to perform color conversion on the input image data generated by the display PC 11, on the display screen 121 of the display apparatus 12, while the color setting system 20 is not attached to the image display system 10. On the other hand, upon creating or changing a color conversion table, the image display system 10 displays a colorimetric image (color patch) selected by the setting PC 21 on the display screen 121 of the display apparatus 12, while the color setting system 20 is attached to the image display system 10. As will be described below, a colorimetric image displayed in this step includes two types of images: a first colorimetric image, and a second colorimetric image.

As described above, for creating a color conversion table to be used for color conversion processing of the display apparatus 12, a colorimetric image needs to be displayed on the display screen 121 of the display apparatus 12, and be measured using the colorimeter 22.

In this exemplary embodiment, different colorimetric images are used for different types of display apparatuses 12, and different color conversion methods are selected for different types of display images. Thus, a color conversion table is created.

Hereinafter, the configuration of the setting PC 21 that uses the color conversion table will be described.

Exemplary Hardware Configuration of Setting PC

First, the hardware configuration of the setting PC 21 will be described.

Figure 3:
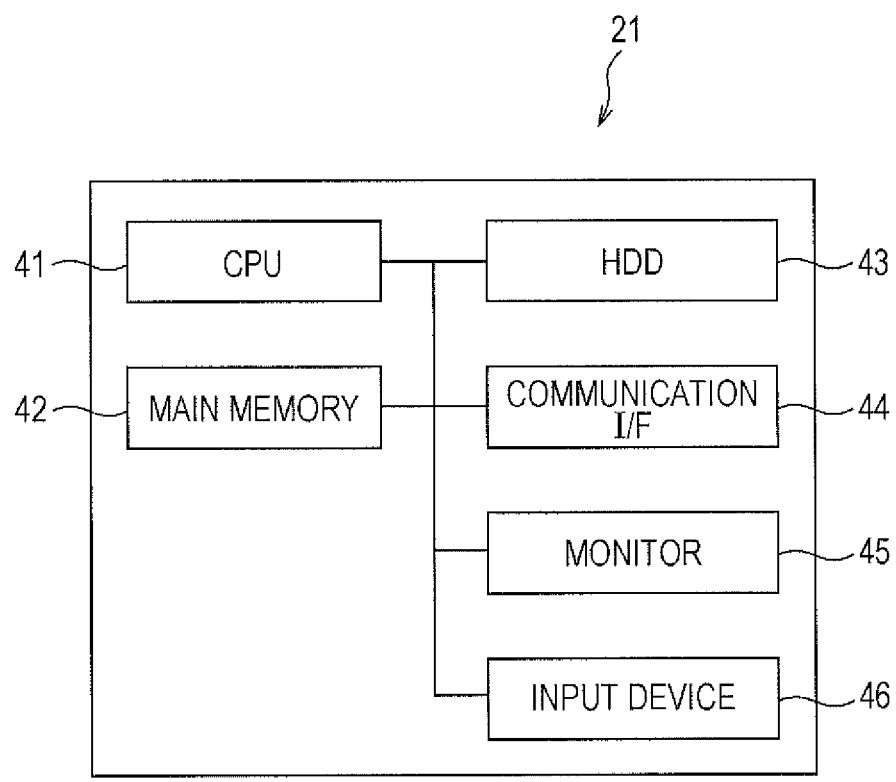
FIG. 3 illustrates the hardware configuration of a setting PC.

FIG. 3 illustrates the hardware configuration of the setting PC 21.

As mentioned above, the setting PC 21 is realized by a personal computer or the like. As illustrated in FIG. 3, the setting PC 21 includes a central processing unit (CPU) 41 serving as a computing unit, a main memory 42 serving as a storage unit, and a hard disk drive (HDD) 43. The CPU 41 executes various types of programs such as the operating system and application software. The main memory 42 is a storage area for storing various programs and data used for execution of the programs. The HDD 43 is a storage area for storing data to be input to various programs and data output from various programs.

The setting PC 21 further includes a communication interface (I/F) 44 for communicating with external devices, a monitor 45 that displays an image and includes a video memory and a display, and an input device 46 such as a keyboard and a mouse.

Exemplary Functional Configuration of Setting PC

Figure 4:
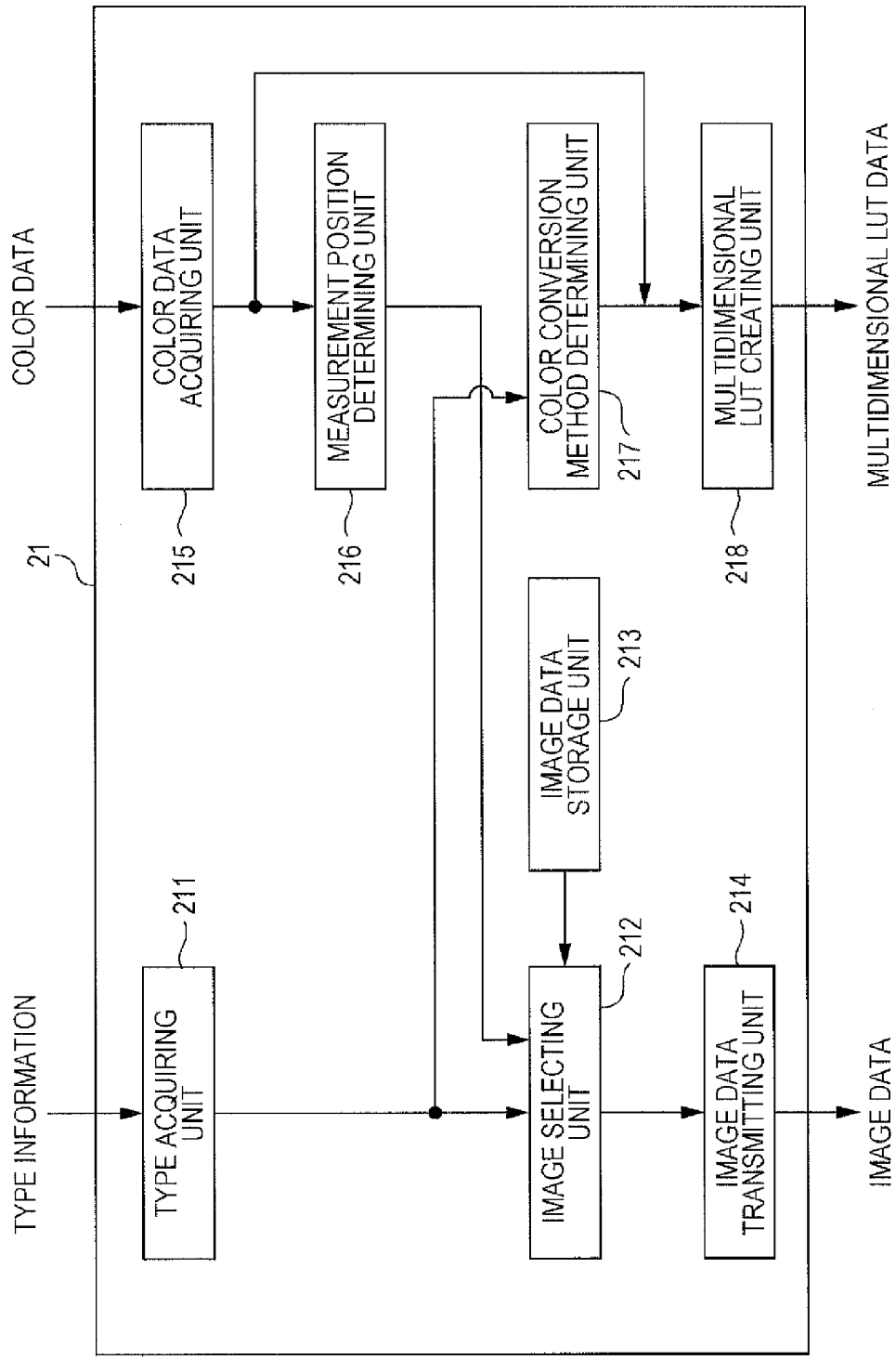
FIG. 4 illustrates an exemplary functional configuration of the setting PC according to the exemplary embodiment.

FIG. 4 illustrates an exemplary functional configuration of the setting PC 21 according to this exemplary embodiment.

The setting PC 21 of FIG. 4 includes a type acquiring unit 211, an image selecting unit 212, an image data storage unit 213, an image data transmitting unit 214, a color data acquiring unit 215, a measurement position determining unit 216, a color conversion method determining unit 217, and a multidimensional LUT creating unit 218.

The type acquiring unit 211 acquires type information indicating the type of the display apparatus 12 (data indicating the type of the display apparatus 12). The type of the display apparatus 12 may be classified by the color gamut difference and the degree of linearity of device characteristics, for example. In this exemplary embodiment, the type is also classified by whether in-plane non-uniformity is likely to occur, and whether limitation of the color viewing angle is likely to occur. The expression "limitation of the viewing angle" as used herein refers to a phenomenon in which the color of the image looks different depending on the direction from which the image is viewed. This phenomenon is likely to occur to the display apparatus 12 using a liquid crystal panel, for example.

Figures 5, 6:
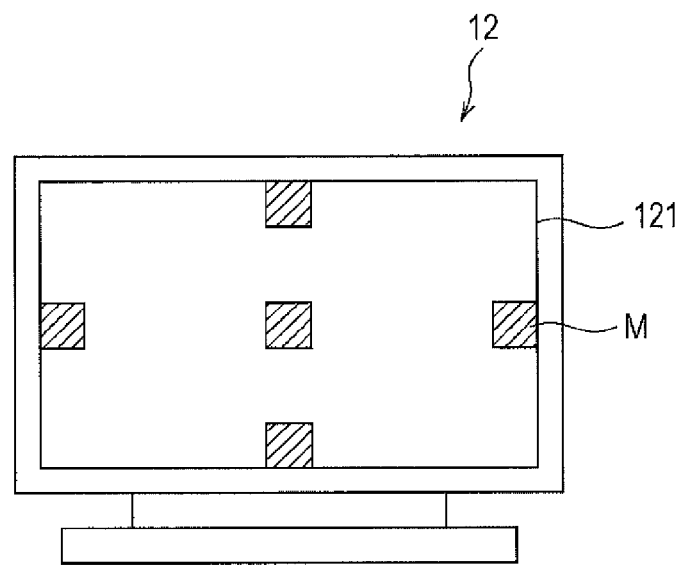
FIG. 5 is a table illustrating types of a display apparatus classified in accordance with classification criteria.
FIG. 6 illustrates second colorimetric images for in-plane non-uniformity diagnosis.

FIG. 5 is a table illustrating types of the display apparatus 12 classified in accordance with the classification criteria described above.

As illustrated in FIG. 5, in this exemplary embodiment, the type of the display apparatus 12 is classified into four types: "desktop", "large-screen", "projector", and "tablet". The type "desktop" refers to a desktop display apparatus such as a liquid display for PC. The type "large-screen" refers to a display apparatus having a large display screen 121 such as a liquid crystal television. The type "projector" refers to an apparatus that projects and displays an image on a screen or the like. The type "tablet" refers to a mobile terminal such as a smartphone and a tablet terminal.

As for the "desktop" display apparatus, since a liquid crystal panel is used, limitation of the color viewing angle is likely to occur. As for the "large-screen" display apparatus, since a liquid crystal panel is often used, limitation of the color viewing angle is likely to occur. Also, since the screen is large, in-plane non-uniformity is likely to occur. As for the "projector", the color gamut greatly differs from that of the other types of display apparatuses, and the device characteristics are likely to be nonlinear. For example, gradation characteristics of each of colors of red (R), green (G), and blue (B) often vary locally. Further, additive color mixture is not established for gray, and therefore a large color shift often occurs. Also, in-plane non-uniformity is likely to occur. As for the "tablet", the color gamut and the linearity of device characteristics do not greatly differ from those of the other types of display apparatuses. Also, limitation of the color viewing angle and in-plane non-uniformity are unlikely to occur. However, since the characteristics of the "tablet" differ from those of the other types of display apparatuses in these regards, the "tablet" is classified as an independent type.

The type information of the display apparatus 12 acquired by the type acquiring unit 211 may be input by an operator who performs color measurement on the display apparatus 12, by using the input device 46 of the setting PC 21, for example.

The image selecting unit 212 selects a colorimetric image for the display apparatus 12, on the basis of the type information acquired by the type acquiring unit 211.

The image data storage unit 213 stores image data of the colorimetric image selected by the image selecting unit 212. Then, the image selecting unit 212 acquires the image data of the selected colorimetric image from the image data storage unit 213.

There are generally two types of colorimetric images that may be selected by the image selecting unit 212. One is a first colorimetric image that is used by the multidimensional LUT creating unit 218 for creating a multidimensional LUT. The other is a second colorimetric image that is used for in-plane non-uniformity and color viewing angle diagnosis. That is, in this exemplary embodiment, the second colorimetric image is an image for measuring at least one of in-plane non-uniformity and the color viewing angle of the display apparatus 12.

The image selecting unit 212 determines whether to select the latter second colorimetric image for diagnosing in-plane non-uniformity and the viewing angle. The determination is made on the basis of the type information acquired by the type acquiring unit 211. If the type of the display apparatus 12 is any of the types that are likely to have in-plane non-uniformity or limitation of the viewing angle, a determination to display the second colorimetric image is made. More specifically, if the type of the display apparatus 12 is "large-screen" or "projector", a determination to display a second colorimetric image for in-plane non-uniformity diagnosis is made. If the type of the display apparatus 12 is "desktop" or "large-screen", a determination to display a second colorimetric image for color viewing angle diagnosis is made.

FIG. 6 illustrates second colorimetric images M for in-plane non-uniformity diagnosis.

In FIG. 6, the same second colorimetric images M for in-plane non-uniformity are displayed at plural predetermined positions on the display screen 121 of the display apparatus 12. In the example of FIG. 6, the same second colorimetric images M are displayed at five positions on the display apparatus 12: top center, center left, center, center right, and bottom center. The degree of in-plane non-uniformity of the display screen 121 of the display apparatus 12 may be measured by measuring each second colorimetric image M. As the second colorimetric image M, a white image and a black image may be selected, for example. Alternatively, a red image, a green image, and a blue image, which are images of basic colors (primary colors) used for representing an image on the display apparatus 12, may be selected. Then, the second colorimetric image M of each color is displayed in the manner illustrated in FIG. 6.

In FIG. 6, the same second colorimetric images M are displayed at plural positions. However, a single image may be displayed across the screen, and measurement may be performed at the positions indicated in FIG. 6.

Figure 7A:
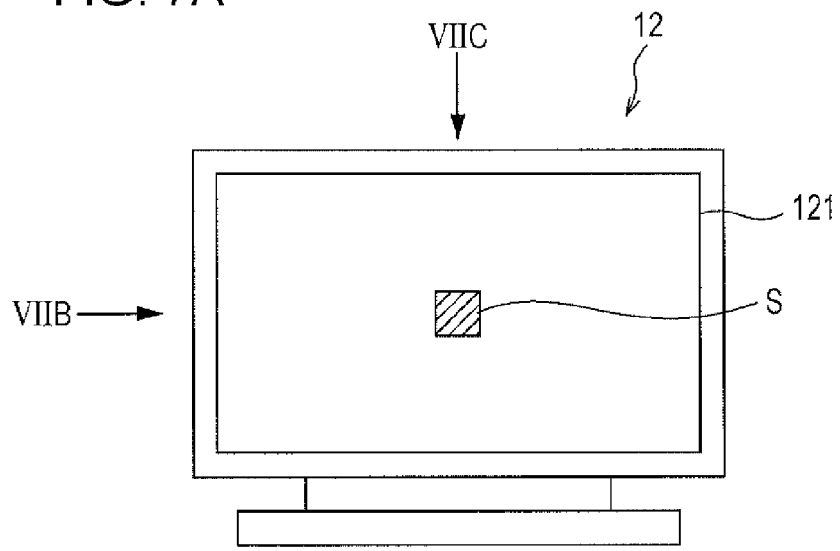
FIGS. 7A through 7C illustrate a method of diagnosing the color viewing angle.
Figure 7B:
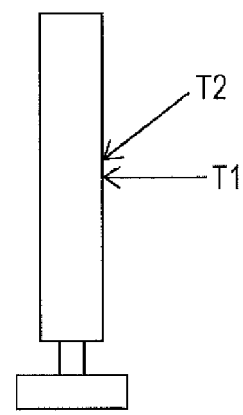
Figure 7C:
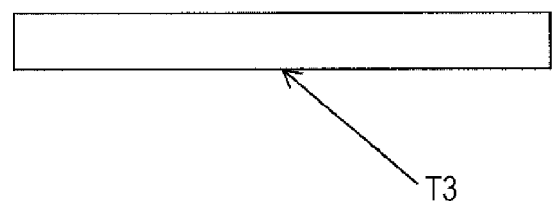

FIGS. 7A through 7C illustrate a method of diagnosing the color viewing angle.

FIG. 7B illustrates the display apparatus 12 of FIG. 7A as viewed from the direction VIIB. FIG. 7C illustrates the display apparatus 12 of FIG. 7A as viewed from the direction VIIC. In other words, FIG. 7C is a top view of the display apparatus 12.

As illustrated in FIG. 7A, a second colorimetric image S for color viewing angle diagnosis is displayed approximately at the center of the display screen 121 of the display apparatus 12. Then, as illustrated in FIG. 7B, color measurement is performed for each of the case where the second colorimetric image S is viewed from the front (the direction of the arrow T1) and the case where the second colorimetric image S is viewed from obliquely above (the direction of the arrow T2). Further, as illustrated in FIG. 7C, color measurement is performed for the case where the second colorimetric image S is viewed from the right (the direction of the arrow T3). In this way, the color viewing angle of the display screen 121 of the display apparatus 12 may be measured. In FIG. 7C, color measurement is performed for the case where the second colorimetric image S is viewed from the right. However, the color viewed from the left side may be measured. That is, the color viewed from either one of the right and left may be measured. Similar to the case of in-plane non-uniformity diagnosis, as the second colorimetric image S, a white image and a black image may be selected, for example. Alternatively, a red image, a green image, and a blue image, which are images of basic colors (primary colors) used for representing an image on the display apparatus 12, may be selected. Then, measurement is performed on the second colorimetric image S of each color in the manner illustrated in FIGS. 7A through 7C.

In this exemplary embodiment, if the type of the display apparatus 12 is "desktop", "large-screen", or "projector", at least one of the second colorimetric image for in-plane non-uniformity diagnosis and the second colorimetric image for color viewing angle diagnosis is displayed on the display apparatus 12. Then, a diagnosis is made as to whether there is an in-plane non-uniformity or a limitation of the color viewing angle. This diagnosis is made by the measurement position determining unit 216 as will be described below in greater detail. A measurement position for performing color measurement is determined on the basis of the diagnosis results. After that, the above-described first colorimetric image is displayed on the display apparatus 12, and color measurement is performed. That is, the image selecting unit 212 determines whether to display the second colorimetric image for determining the position for acquiring color information (color data) of a first colorimetric image on the display apparatus 12, on the basis of the type information, Note that the first colorimetric image to be selected varies depending on the type of the display apparatus 12. Then, the image selecting unit 212 selects a first colorimetric image on the basis of the type of the display apparatus 12. Thus, the selected first colorimetric image is displayed on the display apparatus 12.

More specifically, the image selecting unit 212 changes the number of first colorimetric images to be selected, on the basis of the type information acquired by the type acquiring unit 211. For instance, if the device characteristics of the display apparatus 12 have high nonlinearity, the number of data sets of the first colorimetric image is increased. More specifically, a first colorimetric image in which each of the colors R, G, and B varies at predetermined intervals in an RGB color space is provided as a data set, for example. For a display apparatus 12 having high nonlinearity (low linearity), the interval is reduced. For a display apparatus 12 having high linearity (low nonlinearity), the interval is increased. In this case, the interval may vary between the colors R, G and B. Further, the intervals do not need to be equal. In the case where the color value is represented by 8 bits (by an integer from 0 to 255), the interval may be increased around the point where the color value is 255, for example.

As described above, in this exemplary embodiment, preliminary color measurement for diagnosing in-plane non-uniformity and the color viewing angle using a second colorimetric image may be first performed on the display apparatus 12. A determination whether to perform preliminary color measurement and selection of a second colorimetric image to be used for preliminary color measurement are made by the image selecting unit 212 on the basis of the type information of the display apparatus 12.

After that, color measurement for creating a multidimensional LUT is performed. Selection of a first colorimetric image to be used herein is also made by the image selecting unit 212 on the basis of the type information of the display apparatus 12.

The image data transmitting unit 214 is an example of an image information transmitting unit. In order to perform color measurement on the display apparatus 12, the image data transmitting unit 214 transmits information (image data) on the first colorimetric image and the second colorimetric image selected by the image selecting unit 212 to the display apparatus 12.

The display apparatus 12 displays the first colorimetric image and the second colorimetric image on the basis of the image data of the first colorimetric image and the second colorimetric image transmitted from the image data transmitting unit 214. The colorimeter 22 reads the color of these colorimetric images displayed on the display apparatus 12. Then, the colorimeter 22 transmits color information (color data) obtained by reading these colorimetric images to the setting PC 21. The color data output by the colorimeter 22 are X, Y, and Z values in an XYZ color space, for example. Alternatively, the color data may be $L^*$, $a^*$, and $b^*$ values in an $L^*a^*b^*$ color space.

The color data acquiring unit 215 is an example of a color information acquiring unit, and obtains color data of a colorimetric image transmitted from the colorimeter 22.

When the image selecting unit 212 determines to display the second colorimetric image for in-plane non-uniformity diagnosis or the viewing angle diagnosis, color data of the second colorimetric image displayed on the display apparatus 12 is acquired by the color data acquiring unit 215. The measurement position determining unit 216 determines a position for acquiring color data of the first colorimetric image on the basis of the acquired color data of the second colorimetric image. The position for acquiring the color data of the first colorimetric image may include two types. One is the display position of the first colorimetric image on the display screen 121 of the display apparatus 12 (in the case of in-plane non-uniformity diagnosis), and the other is the angle between the calorimeter 22 and the display screen 121 upon performing color measurement (in the case of color viewing angle diagnosis).

More specifically, a determination is made as to whether the color data obtained with the method illustrated in FIG. 6 or the method illustrated in FIGS. 7A through 7C is less than or equal to a reference value.

In the case of in-plane non-uniformity, the maximum value and the minimum value of the color data are compared with the average value. If the difference is less than or equal to the reference value, the in-plane non-uniformity is determined to be within the acceptable range. Then, the position where color data indicating the value closest to the average value is measured is selected as a position for performing color measurement on the first colorimetric image. On the other hand, if the difference is greater than the reference value, plural positions are selected as positions for performing color measurement on the first colorimetric image. For example, three positions where color data indicating the maximum value, color data indicating the minimum value, and color data indicating the median value are measured are selected as positions for performing color measurement.

In the case of the color viewing angle, color data obtained in the case where the second colorimetric image is viewed from the front and color data obtained in the case where the second colorimetric image is viewed from another direction are compared. If the difference is less than or equal to a reference value, the color viewing angle is determined to be within the acceptable range. Then, a position in front of the first colorimetric image is selected as the position for performing color measurement of the first colorimetric image. On the other hand, if the difference is greater than the reference value, plural positions are selected as positions for performing color measurement of the first colorimetric image. For example, a position in front of the first colorimetric image, a position obliquely above, and a position at the left are selected as positions for performing color measurement.

The color conversion method determining unit 217 selects a method for performing color conversion on the display apparatus 12, on the basis of the type information acquired by the type acquiring unit 211. More specifically, the color conversion method determining unit 217 determines, as a method for performing color conversion, the degree of conversion for the case of converting the color gamut and for the case of converting the hue.

FIGS. 8A through 8C illustrate a color conversion method performed by the color conversion method determining unit 217.

In this exemplary embodiment, as illustrated in FIG. 8A, the degree of conversion of color gamut and hue is divided into three levels. In FIG. 8A, "A" is the case in which the degree of conversion of color gamut or hue is the highest, and "B" is the case in which the degree of conversion of color gamut or hue is the lowest. Further, "B" is the case in which conversion of color gamut or hue is performed at the intermediate degree. In FIG. 8A, "○" indicates that the color gamut is compressed or expanded using a compression-expansion coefficient, and "x" indicates that the color gamut is converted without using a compression-expansion coefficient.

FIG. 8B illustrates the case where compression of color gamut is performed as conversion of color gamut.

The case "A" of FIG. 8B corresponds to the case "A" of FIG. 8A. In this case, compression of color gamut is performed by multiplying by a compression-expansion coefficient. The compression-expansion coefficient, which represents the degree of compression of color gamut, is set to be the highest. Accordingly, as illustrated in the case "A" of FIG. 8B, the degree of chromaticity shift is the largest.

The case "C" of FIG. 8B corresponds to the case "C" of FIG. 8A. In this case, the color gamut is converted without using a compression-expansion coefficient, and all the points that are located outside the color gamut after compression of color gamut are converted onto a set color gamut contour.

The case "B" of FIG. 8B corresponds to the case "B" of FIG. 8A. In this case, color gamut conversion is performed by multiplying by a compression-expansion coefficient. However, the compression-expansion coefficient is set to be less than that of the case "A". Accordingly, as illustrated in FIG. 8B, the result of color gamut conversion is between the result of the case "A" and the result of the case "C".

As for expansion of color gamut illustrated in FIG. 8A, in the case "A" of FIG. 8A, expansion of color gamut is performed by multiplying by a compression-expansion coefficient. In the cases "B" and "C" of FIG. 8A, a compression-expansion coefficient is not used, and all the points are converted onto a set color gamut contour.

FIG. 8C illustrates hue conversion.

The case "A" of FIG. 8C corresponds to the case "A" of FIG. 8A. In this case, hue conversion is performed by multiplying by a hue correction coefficient. The hue correction coefficient is set to be the highest in this case. Accordingly, as illustrated in the case "A" of FIG. 8C, the degree of hue conversion is the highest.

The case "C" of FIG. 8C corresponds to the case "C" of FIG. 8A. In this case, hue conversion is not performed.

The case "B" of FIG. 8C corresponds to the case "B" of FIG. 8A. In this case, hue conversion is performed by multiplying by a hue correction coefficient. However, the hue correction coefficient is set to be less than that of the case "A". Accordingly, as illustrated in FIG. 8C, the result of hue conversion is between the result of the case "A" and the result of the case "C".

FIG. 9 is a table summarizing the items discussed above.

In this table, the first column and the second column indicate the degree of color gamut conversion and the degree of hue conversion, respectively, as a method for performing color conversion on the display apparatus 12, for each of "desktop", "large-screen", "projector", and "tablet", which are set as the types of the display apparatus 12 in this exemplary embodiment. In this table, "A" through "C" correspond to "A" through "C" of FIG. 8A. The degree of conversion is the highest in "A", and is the lowest in "C". The degree of conversion of "B" is between that of "A" and that of "C".

That is, as for color gamut conversion, "desktop" and "large-screen" are given the highest conversion degree. The color gamut of these two types is wider than that of the other types, and therefore needs to be greatly compressed.

As for hue conversion, "projector" is given the highest conversion degree. The hue of "projector" often greatly differs from that of the other types, and therefore the degree of hue conversion needs to be high.

The third and fourth columns indicate whether in-plane non-uniformity is likely to occur and whether limitation of the color viewing angle is likely to occur, respectively, for each type. In this table, "○" indicates that in-plane non-uniformity or limitation of the color viewing angle is likely to occur, and "x" indicates that in-plane non-uniformity or limitation of the color viewing angle is unlikely to occur.

That is, in-plane non-uniformity is likely to occur to "large-screen" and "projector", and limitation of the color viewing angle is likely to occur to "desktop" and "large-screen". Accordingly, the above-described second colorimetric image for in-plane non-uniformity or color viewing angle diagnosis is selected for these types, and the degree of in-plane non-uniformity or the color viewing angle is determined.

The fifth column indicates the number of data sets of the first colorimetric image for each type. In this table, "A" indicates that the number of data sets is set to be the highest, and "C" indicates that the number of data sets is set to be the lowest. The number of data sets of "B" is between that of "A" and that of "C". That is, the relationship of the number of data sets is represented by "A">"B">"C". In this table, "projector" is given the greatest number of data sets. This is because the device characteristics of "projector" are likely to be nonlinear. The accuracy of color conversion is improved by increasing the number of data sets.

In FIG. 9, the sixth column indicates "illumination environment". Although not described above, this item indicates whether the display apparatus 12 is used in an environment without illumination under normal conditions of use. More specifically, "○" indicates that the display apparatus 12 may be used in both an environment with illumination and an environment without illumination. On the other hand, "x" indicates that the display apparatus 12 is usually used in an environment with illumination, and is not used in an environment without illumination. That is, the types other than "desktop" may be used in both of these environments. Accordingly, in this exemplary embodiment, the first colorimetric image may be selected in view of "illumination environment". More specifically, as for "large-screen", "projector", and "tablet", color measurement is performed on the same first colorimetric image in both an environment with illumination and an environment without illumination.

The multidimensional LUT creating unit 218 serves as a conversion relationship creating unit that creates a color conversion table for the color of an image to be displayed on the display apparatus 12, on the basis of the color data acquired by the color data acquiring unit 215.

Description of Operations of Setting PC

FIG. 10 is a flowchart illustrating exemplary operations performed by the setting PC 21.

Hereinafter, operations of the setting PC 21 will be described with reference to FIG. 4 and FIG. 10.

First, the type acquiring unit 211 acquires type information of the display apparatus 12 (step S101).

The type information is transmitted to the image selecting unit 212. The image selecting unit 212 determines whether to display a second colorimetric image on the display apparatus 12, on the basis of the type information (step S102). As mentioned above, the second colorimetric image includes an image for in-plane non-uniformity diagnosis and an image for color viewing angle diagnosis.

If a determination to display a second colorimetric image is made (Yes in step S102), the image selecting unit 212 selects a second colorimetric image (step S103). Then, the image selecting unit 212 acquires image data of the selected second colorimetric image from the image data storage unit 213 (step S104).

The acquired image data of the second colorimetric image is transmitted from the image data transmitting unit 214 to the display apparatus 12 (step S105). The display apparatus 12 displays the second colorimetric image at each predetermined position in a predetermined order.

The colorimeter 22 reads the color of the second colorimetric image, and transmits color data obtained as the color measurement results to the setting PC 21. The color data is acquired by the color data acquiring unit 215 (step S106).

Then, the measurement position determining unit 216 determines a position for measuring a first colorimetric image (position for acquiring color data of a first colorimetric image) (step S107).

After step S107, or if the image selecting unit 212 determines not to display a second colorimetric image (No in step S102), then the image selecting unit 212 selects a first colorimetric image for creating a multidimensional LUT, on the basis of the type information (step S108).

Then, the image selecting unit 212 acquires image data of the selected first colorimetric image from the image data storage unit 213 (step S109).

The acquired image data of the first colorimetric image is transmitted from the image data transmitting unit 214 to the display apparatus 12 (step S110). The display apparatus 12 displays the first colorimetric image at each of predetermined positions in a predetermined order. Note that the first colorimetric image is displayed at each predetermined position on the display screen 121 of the display apparatus 12 determined by the measurement position determining unit 216. In the case where the image selecting unit 212 determines not to display a second colorimetric image, the first colorimetric image is displayed at the center of the display screen 121, for example.

The colorimeter 22 reads the color of the first colorimetric image, and transmits color data obtained as the color measurement results to the setting PC 21. The color data is acquired by the color data acquiring unit 215 (step S111).

Then, the color conversion method determining unit 217 determines a method for performing color conversion on the display apparatus 12, on the basis of the type information (step S112).

Then, the multidimensional LUT creating unit 218 creates a multidimensional LUT for adjusting the color of an image to be displayed on the display apparatus 12 (step S113), in accordance with the determined method of performing color conversion (step S113).

Then, the data of the created multidimensional LUT is stored as grid point data of the multidimensional LUT as a color conversion table stored in the color conversion table storage unit 132 (see FIG. 1) of the color processing apparatus 13.

According to the exemplary embodiment described above, it is possible to appropriately select a first colorimetric image even in the case where the color gamut of the display apparatus 12 greatly differs from that of the other types of display apparatuses, where the color representation characteristic of even the same display apparatus 12 varies due to in-plane non-uniformity or limitation of the color viewing angle, or where the display apparatus 12 has non-linear device characteristics. Accordingly, it is possible to create a color conversion table that allows color conversion processing to be performed on the display apparatus 12 with high accuracy.

In the example described above, the type information is input by an operator. However, the type information does not need to be input in this manner. For example, a third colorimetric image for determining the type may be separately provided. Thus, the type may be "automatically" determined by performing color measurement on the third colorimetric image. In this case, the image selecting unit 212 selects a third image colorimetric image for determining the type. Then, the image selecting unit 212 determines the type on the basis of color data acquired by the color data acquiring unit 215, and generates type information. In this case, a type determining unit may be added to the exemplary functional configuration of the setting PC 21 of FIG. 4. Thus, the type determining unit determines the type, and the type acquiring unit 211 acquires the generated type information.

More specifically, for example, in the case where the type is "projector", the distance between G and B of the basic colors (primary colors) on the chromaticity diagram tends to be less than those of the other types. Accordingly, a green image and a blue image may be selected as the third colorimetric image so as to determine whether the type is "projector" on the basis of color data obtained by performing color measurement on this image. With regard to such a distance between the basis colors, the type having a relatively small distance between the basic colors includes "projector" and "tablet", and the type having a relatively large distance includes "desktop" and "large-screen". The type may also be determined on the basis of the luminance difference between a white image and a black image displayed on the display screen 121 of the display apparatus 12. The type having a relatively small luminance difference includes "projector", and the type having a relatively large luminance difference includes "desktop" and "large-screen".

Description of Color Adjustment System

The color processing apparatus 13 and the setting PC 21 described above may be regarded as a color adjustment system that includes: the color processing apparatus 13 that performs color conversion processing on image data for displaying an image on the display apparatus 12, using a predetermined conversion relationship, and outputs the processed image data to the display apparatus 12; and the setting PC 21 that creates the conversion relationship used by the color processing apparatus 13. Further, the color adjustment system may further include the display apparatus 12 that displays an image, in addition to the color processing apparatus 13 and the setting PC 21.

Description of Program

As mentioned above, the process executed by the setting PC 21 in this exemplary embodiment described above may be provided as a program such as application software, for example.

Accordingly, the process executed by the setting PC 21 may be regarded as a program causing a computer to realize functions of: acquiring type information indicating the type of the display apparatus 12; selecting a first colorimetric image for performing color conversion on the display apparatus 12, on the basis of acquired type information; transmitting image data of the selected first colorimetric image to the display apparatus 12; acquiring color data of an image which is displayed on the display apparatus 12 on the basis of the transmitted image data of the first colorimetric image; and creating a color conversion table for the color of an image to be displayed on the display apparatus 12, on the basis of the acquired color data.

The program that realizes this exemplary embodiment may be provided by a communication unit, and may be provided in the form of a storage medium such as a CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a processor configured to act as:
  a type acquiring unit that acquires type information indicating a type of a display apparatus;
  an image selecting unit that selects a first colorimetric image for performing color conversion on the display apparatus, on the basis of the type information acquired by the type acquiring unit, and the image selecting unit that determines whether to display a second colorimetric image for determining a position for acquiring color information of the first colorimetric image on the display apparatus, on the basis of the type information;
  an image information transmitting unit that transmits information on the first colorimetric image selected by the image selecting unit to the display apparatus;
  a color information acquiring unit that acquires color information of an image which is displayed on the display apparatus on the basis of the information on the first colorimetric image transmitted by the image information transmitting unit;
  a conversion relationship creating unit that creates a conversion relationship for a color of an image to be displayed on the display apparatus, on the basis of the color information acquired by the color information acquiring unit; and
  a measurement position determining unit that, when the image selecting unit determines to display the second colorimetric image, determines a position for acquiring color information of the first colorimetric image, on the basis of a color information of the second colorimetric image displayed on the display apparatus, the color information of the second colorimetric image being acquired by the color information acquiring unit.

2. The image processing apparatus according to claim 1, further comprising:
 a color conversion method determining unit that determines a method for performing color conversion on the display apparatus, on the basis of the type information acquired by the type acquiring unit.

3. The image processing apparatus according to claim 1, wherein the image selecting unit that changes the number of first colorimetric images to be selected, on the basis of the type information acquired by the type acquiring unit.

4. The image processing apparatus according to claim 1, wherein the second colorimetric image selected by the image selecting unit is an image for measuring at least one of in-plane non-uniformity and a color viewing angle of the display apparatus.

5. The image processing apparatus according to claim 1, wherein the image selecting unit selects a third colorimetric image for determining the type, determines the type on the basis of color information of the third colorimetric image acquired by the color information acquiring unit, and generates the type information.

6. A color adjustment system comprising:
 a color converter that performs color conversion processing on image information for displaying an image on a display apparatus, using a predetermined conversion relationship, and outputs the processed image information to the display apparatus; and
 a conversion relationship creator that creates the conversion relationship used by the color converter, the conversion relationship creator including a processor configured to act as:
  a type acquiring unit that acquires type information indicating a type of the display apparatus,
  an image selecting unit that selects a first colorimetric image for performing color conversion on the display apparatus, on the basis of the type information acquired by the type acquiring unit, and the image selecting unit that determines whether to display a second colorimetric image for determining a position for acquiring color information of the first colorimetric image on the display apparatus, on the basis of the type information,
  an image information transmitting unit that transmits information on the first colorimetric image selected by the image selecting unit to the display apparatus,
  a color information acquiring unit that acquires color information of an image which is displayed on the display apparatus on the basis of the information on the first colorimetric image transmitted by the image information transmitting unit,
  a conversion relationship creating unit that creates the conversion relationship on the basis of the color information acquired by the color information acquiring unit, and
  a measurement position determining unit that, when the image selecting unit determines to display the second colorimetric image, determines a position for acquiring color information of the first colorimetric image, on the basis of a color information of the second colorimetric image displayed on the display apparatus, the color information of the second colorimetric image being acquired by the color information acquiring unit.

7. A color adjustment system comprising:
a display apparatus that displays an image;
a color converter that performs color conversion processing on image information for displaying the image on the display apparatus, using a predetermined conversion relationship, and outputs the processed image information to the display apparatus; and
a conversion relationship creator that creates the conversion relationship used by the color converter, the conversion relationship creator including a processor configured to act as:
  a type acquiring unit that acquires type information indicating a type of the display apparatus,
  an image selecting unit that selects a first colorimetric image for performing color conversion on the display apparatus, on the basis of the type information acquired by the type acquiring unit, and the image selecting unit that determines whether to display a second colorimetric image for determining a position for acquiring color information of the first colorimetric image on the display apparatus, on the basis of the type information,
  an image information transmitting unit that transmits information on the first colorimetric image selected by the image selecting unit to the display apparatus,
  a color information acquiring unit that acquires color information of an image which is displayed on the display apparatus on the basis of the information on the first colorimetric image transmitted by the image information transmitting unit,
  a conversion relationship creating unit that creates the conversion relationship on the basis of the color information acquired by the color information acquiring unit, and
  a measurement position determining unit that, when the image selecting unit determines to display the second colorimetric image, determines a position for acquiring color information of the first colorimetric image, on the basis of a color information of the second colorimetric image displayed on the display apparatus, the color information of the second colorimetric image being acquired by the color information acquiring unit,
  wherein the image selecting unit determines whether to display a second colorimetric image for determining a position for acquiring color information of the first colorimetric image on the display apparatus, on the basis of the type information.

8. An image processing method comprising:
acquiring type information indicating a type of a display apparatus;
selecting a first colorimetric image for performing color conversion on the display apparatus, on the basis of the acquired type information;
transmitting information on the selected first colorimetric image to the display apparatus;
acquiring color information of an image which is displayed on the display apparatus on the basis of the transmitted information on the first colorimetric image;
creating a conversion relationship for a color of an image to be displayed on the display apparatus, on the basis of the acquired color information;
determining whether to display a second colorimetric image for determining a position for acquiring color information of the first colorimetric image on the display apparatus, on the basis of the type information; and
when it is determined to display the second colorimetric image, determining a position for acquiring color information of the first colorimetric image, on the basis of a color information of the second colorimetric image displayed on the display apparatus.

9. A non-transitory computer readable medium storing a program causing a computer to execute an image processing process, the process comprising:
acquiring type information indicating a type of a display apparatus;
selecting a first colorimetric image for performing color conversion on the display apparatus, on the basis of the acquired type information;
transmitting information on the selected first colorimetric image to the display apparatus;
acquiring color information of an image which is displayed on the display apparatus on the basis of the transmitted information on the first colorimetric image;
creating a conversion relationship for a color of an image to be displayed on the display apparatus, on the basis of the acquired color information;
determining whether to display a second colorimetric image for determining a position for acquiring color information of the first colorimetric image on the display apparatus, on the basis of the type information; and
when it is determined to display the second colorimetric image, determining a position for acquiring color information of the first colorimetric image, on the basis of a color information of the second colorimetric image displayed on the display apparatus.

* * * * *